Figure 1:
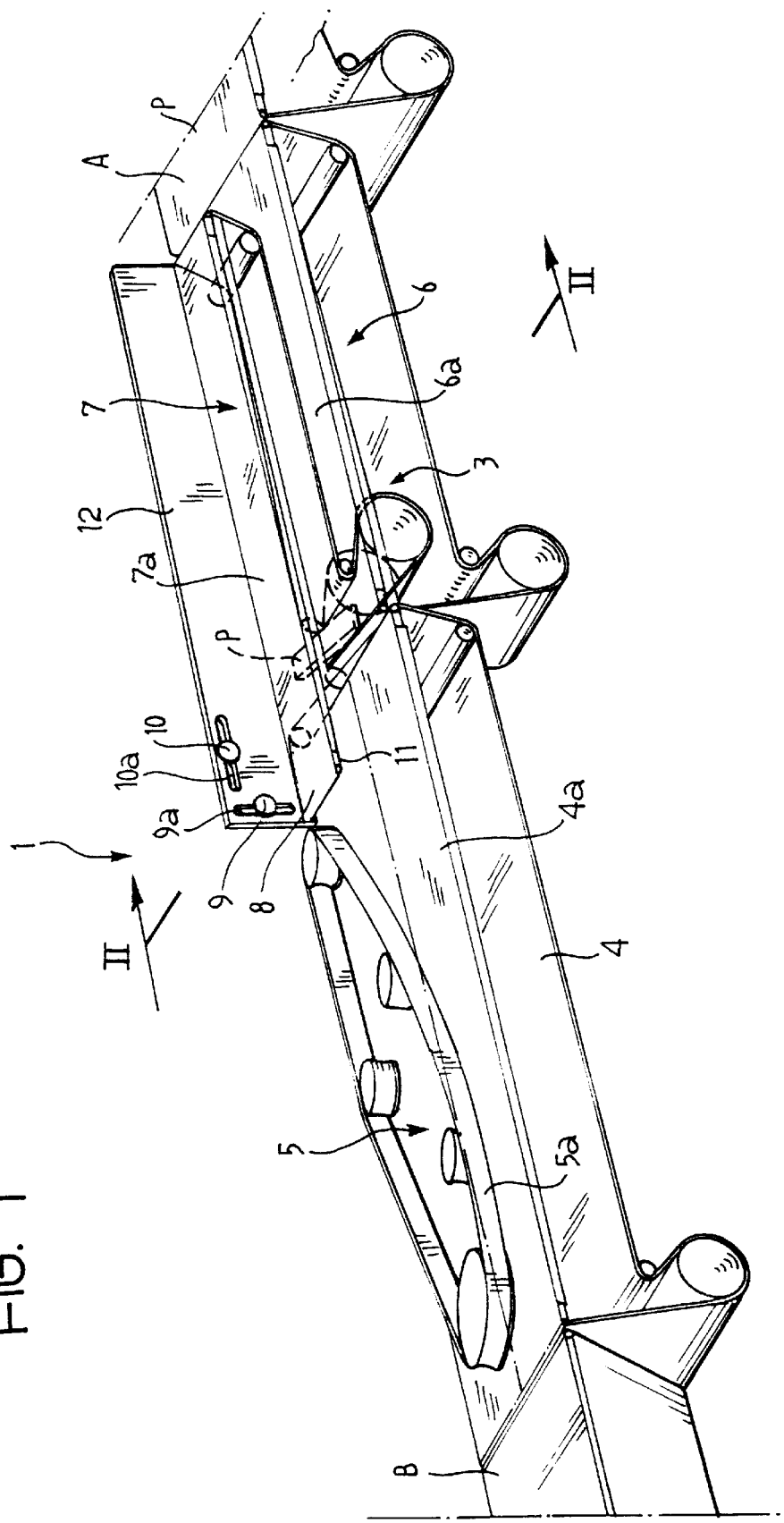

United States Patent [19]
Francioni

[11] Patent Number: 5,924,548
[45] Date of Patent: Jul. 20, 1999

[54] DEVICE FOR CHANGING THE ORIENTATION OF TRANSPORTED ARTICLES, FOR EXAMPLE, FOR AUTOMATIC PACKAGING PLANTS

[75] Inventor: Renzo Francioni, Prato Sesia, Italy

[73] Assignee: Cavanna, S.P.A., Italy

[21] Appl. No.: 08/883,876

[22] Filed: Jun. 27, 1997

[30] Foreign Application Priority Data

Jul. 5, 1996 [IT] Italy ................................. TO96A0581

[51] Int. Cl.⁶ ................................................. B65G 47/24
[52] U.S. Cl. .......................................................... 198/415
[58] Field of Search ..................................... 198/415, 408

[56] References Cited

U.S. PATENT DOCUMENTS

| | | | |
|---|---|---|---|
| 2,707,924 | 5/1955 | Hansen | 198/415 |
| 4,676,361 | 6/1987 | Heisler. | |
| 4,889,224 | 12/1989 | Denker | 198/415 |
| 5,383,760 | 1/1995 | Cawley et al. | 198/415 |
| 5,544,733 | 8/1996 | Shaver | 198/408 |

FOREIGN PATENT DOCUMENTS

| | | |
|---|---|---|
| 0 218 550 | 4/1987 | European Pat. Off. . |
| 7302039 | 8/1974 | Netherlands . |
| 2224986 | 5/1990 | United Kingdom . |
| 9224724 | 11/1992 | United Kingdom . |

*Primary Examiner*—Joseph E. Valenza
*Assistant Examiner*—Khoi H. Tran
*Attorney, Agent, or Firm*—Trask, Britt & Rossa

[57] ABSTRACT

The articles to be turned round are advanced on conveyor means having a downstream portion which is intended to support one end of each article and is located in a generally raised position projecting over a successive conveyor portion. In the region of the downstream portion, the articles are held in an inclined position, supported at their ends. This allows a turning movement to be brought about as a result of the speed difference between the downstream end and the successive conveyor portion.

8 Claims, 2 Drawing Sheets

DEVICE FOR CHANGING THE ORIENTATION OF TRANSPORTED ARTICLES, FOR EXAMPLE, FOR AUTOMATIC PACKAGING PLANTS

The present invention relates to devices for changing the orientation of transported articles according to the preamble to claim 1.

The invention has been developed with particular attention to its possible use in the field of plant for the automatic packaging of food products such as, for example, confectionery, chocolate bars, etc. Reference to this application should not, however, be taken as limiting of the scope of the invention.

The solutions used in the art for changing the orientation of transported articles can be reduced to a few basic approaches.

For example, there are solutions which provide for an actual gripping action to be exerted on the articles in order to change their orientation.

Other solutions provide for the change in the orientation of the articles, usually relative to their direction of transportation, to be accompanied by a variation/change in the direction of transportation. For example, articles advancing "crosswise" on a first conveyor are transferred onto a second conveyor the direction of advance of which is perpendicular to that of the first conveyor so that the articles advance "lengthwise" on the second conveyor. Naturally, a dual solution may be used, in which the articles which initially advance "lengthwise" are subsequently advanced "crosswise" in a direction perpendicular to the original direction of advance.

Moreover, there are further solutions in which the articles are turned round by being caused to advance astride two conveyors disposed side by side and driven at different speeds. The orientation of the articles supported on the two conveyors changes as a result of the speed difference. A variant of this solution provides for the use of two belt conveyors in cascade, connected by a transition region arranged obliquely relative to the general direction of advance of the articles. A speed difference of the two connected portions of belt can be created throughout the transition zone, achieving the desired turning effect.

Tests carried out by the Applicant show that the last-mentioned solutions are completely satisfactory as long as the articles are supported sufficiently uniformly and securely on the surfaces of the conveyors which bring about the turning. However, the result of the turning operation is actually unpredictable and unreliable with articles having lower surfaces which are generally not smooth but undulating with projecting portions. This is true in particular where irregular undulations of a random or pseudo-random nature are involved (to give a typical example: bars of chocolate with hazelnuts having lower surfaces from which portions of the nuts embedded in the mass of chocolate project to a greater or lesser extent).

This can easily be understood if it is borne in mind that the rotary movements upon which the turning action is based in fact take place about centres which are identified by the positions of the projecting portions. In particular when there is an irregular, random, or pseudo-random distribution of these projecting portions, the distribution of the instantaneous centres of rotation is also irregular, random or pseudo-random so that there may be wide variations between products processed in succession.

The object of the present invention is to provide a device for changing the orientation of transported articles of the type specified above, in which the aforementioned problems are prevented, even with articles having very irregular features on their surfaces which bear on the conveyors.

According to the present invention, this object is achieved by means of a device having the specific characteristics recited in the following claims.

Figure 2:
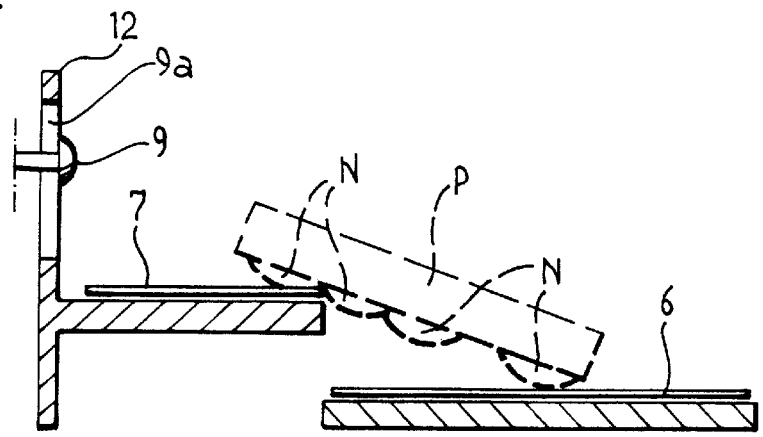
Figure 3:
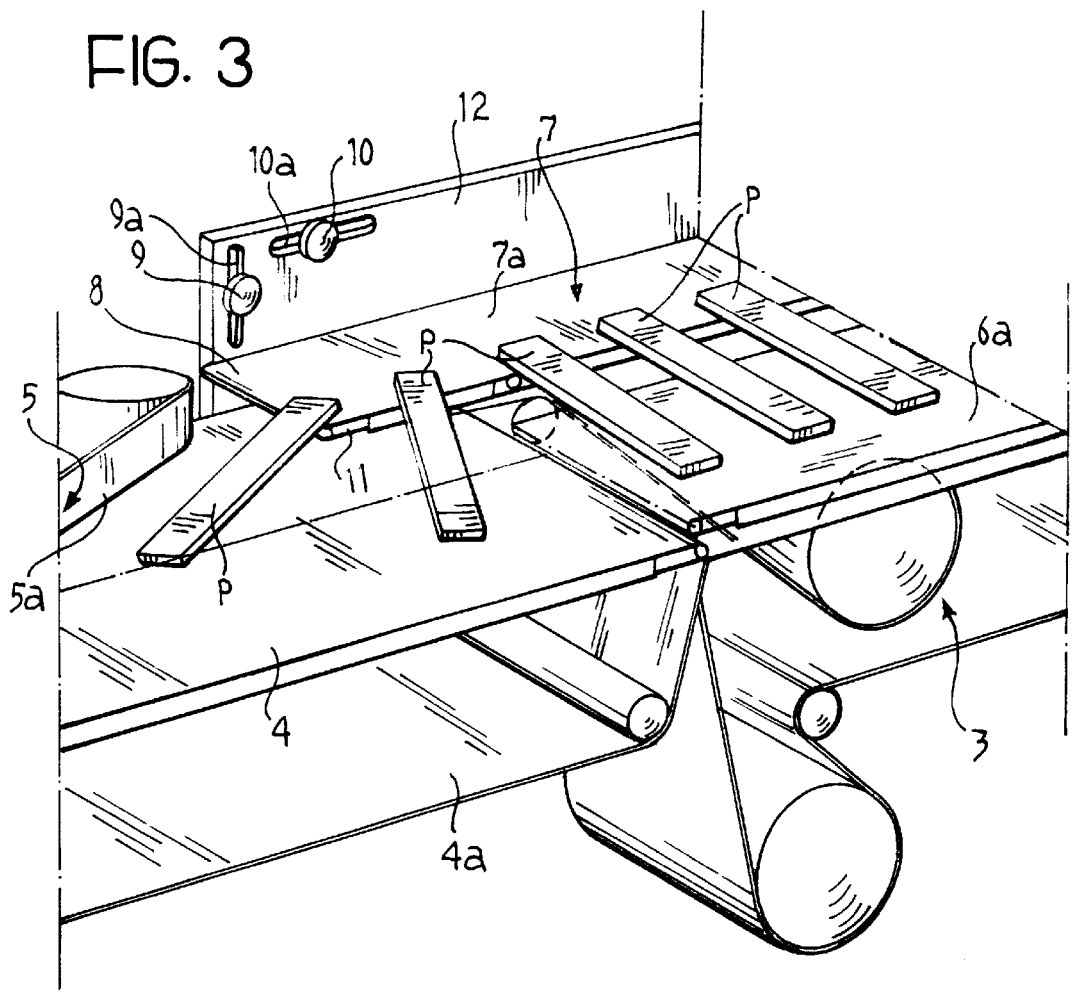

The invention will now be described, purely by way of non-limiting example, with reference to the appended drawings, in which:

FIG. 1 is a general perspective view of a portion of a conveyor system incorporating a device according to the invention, FIG. 2 is a schematic section taken on the line II—II of FIG. 1, and FIG. 3 shows the operation of the device according to the invention, in greater detail.

The device according to the invention, generally indicated 1, is intended, in general, to operate between an input conveyor A and an output conveyor B included, for example, in a plant of generally known type for the automatic packaging of articles P such as food products (for example, chocolate bars, etc.).

In the most usual (but not essential) embodiment, both of the conveyors A and B are motor-driven belt conveyors of the type currently used in plants for the packaging of confectionery and similar products.

Essentially, the function of the device 1 is to act on articles P each having two opposed ends aligned on a given axis (the principal axis or dimension) to transform an input flow of articles P advancing "crosswise" (that is, with their major axes extending substantially perpendicular to the direction of advance) into an output flow of articles P advancing "lengthwise", that is, with their major axes extending parallel to the direction of advance. Naturally, this is an example given purely by way of illustration.

In the currently-preferred embodiment, the device 1 provides for the use of two conveyor stages in cascade, indicated 3 and 4, respectively. As will be described further below, these may also be motor-driven belt conveyors of generally known type. Their structural details may be considered known to an expert in the art and in any case are irrelevant per se for an understanding of the specific characteristics of the invention. For this reason, these details will not be described below.

In the embodiment illustrated, the input conveyor A also performs the function of a metering conveyor, in the sense that it operates (in known manner) so as to cause the articles P to arrive at the device 1 a certain distance apart so that the desired turning movement (rotation) can take place without giving rise to interference between successive articles. Clearly, should the articles P advance on the input conveyor A with insufficient spacing to allow for the turning movement, another, intermediate conveyor (not shown) with a faster speed than the conveyor A would be interposed between the conveyor A and the device 1 (according to known criteria), with the function of spacing out the articles P.

At its upstream end, the conveyor 4 performs an active function in bringing about the turning movement of the articles P, in accordance with criteria which will be described further below. The downstream portion of the same conveyor 4 also performs an operation for perfecting the orientation of the articles P.

Naturally, the terms "upstream" and "downstream" as used below in the present description and in the following claims, relate to the direction of advance of the articles P from right to left as seen in FIGS. 1 and 3.

For this purpose, the conveyor 4 has an upper or active conveyor pass, indicated 4a, with which a motor-driven belt alignment device, indicated 5, is associated. The device 5 has a respective active pass (at the front as seen in FIGS. 1 and 3) which cooperates with the articles P, aligning their major axes with the direction of transportation of the conveyor 4. For this purpose, the upper pass 4a of the conveyor 4 may be slightly inclined (rearwardly as seen in FIGS. 1 and 3) so that the articles P are certain to be brought into abutment with the active pass 5a of the device 5. The respective structural details and the general methods of operation are essentially similar to those described in GB-A-2 263 264 assigned to the ownership of the present applicant.

The conveyor unit 3 is constituted essentially by two conveyors 6 and 7 (also in this case preferably of the motor-driven belt type) arranged with their upper conveyor passes 6a, 7a side by side.

All of the conveyors (A, B, 3, 4, 6, 7) described above, as well as the device 5, have respective associated drive members (not shown in the drawings, but of known type). These members are functionally interconnected (for example, owing to control by a general control system of the plant such as a so-called PLC or similar device) which synchronizes their movement in accordance with known criteria.

Unlike the previously known solutions in which two conveyors disposed side by side and advancing at different speeds are used for turning purposes, the conveyors 6 and 7 of the device 1 according to the invention are usually advanced at the same speed. At least in principle, the two conveyors 6 and 7 could, in fact, be fused into a single conveyor element, their different lengths being formed at the end 8 situated downstream in the direction of advance of the articles P (as stated, from right to left as seen in FIGS. 1 and 3) in the form of a transition region oriented generally obliquely relative to the direction of advance of the articles P.

In any case, the use of two separate, motor-driven, belt conveyors 6,7 is preferable for structural reasons. For this reason, the following part of the present description will refer exclusively to this preferred solution.

The conveyor pass 6a of the conveyor 6 extends horizontally, connecting two conveyors situated upstream and downstream, respectively (that is, the conveyor passes of the belts A and 4, in the embodiment illustrated). At its upstream end, the conveyor 7 is arranged with its active pass 7a aligned at the same height as the downstream end of the belt A. The active pass 7a is then generally inclined so that the downstream end, indicated 8, of the conveyor 7 in question is raised relative to the horizontal plane of alignment of the active passes 4a and 6a of the conveyors 6 and 4 and projects at least marginally beyond the downstream end of the conveyor 6, over the input end of the conveyor 4.

The amount by which the downstream end 8 of the conveyor 7 is raised, as well as the amount by which this end projects downstream of the output end of the conveyor 6 over the input end of the conveyor 4 are preferably adjustable. For example, this result can be achieved by an adjustment mechanism shown schematically in the form of two support elements 9 and 10 which can support the idler element defining the downstream end 8. This element may be constituted, for example, by an idler roller or, as in the embodiment illustrated, by a so-called "feather" 11. The mechanism in question allows the element 11 to be supported at a selectively adjustable height by adjustment of the element 9 (constituted, for example, by a fixing pin slidable in a respective slot 9a formed in a support side 12 of the device 1), with a further capability for selective adjustment of the longitudinal position of the element 11 by means of the element 10 (also constituted by a kind of pin which can slide longitudinally in a slot 10a formed in the support side 12).

The elements 9 and 10 have respective associated locking means (not shown specifically in the drawings) which enable them to be fixed in the position selected at the time in question after the adjustment movement.

Clearly, the embodiment shown schematically by way of example, is only one of the various possible ways, well known to an expert in the art, in which the position of the end 8 can be varied selectively both in height and as regards its longitudinal position relative to the device 1.

The general operating criteria of the device 1 can easily be understood from an imaginary following of the path of any one of the articles P which is on the device 1, starting from the output end of the input conveyor A.

The article P in question reaches the conveyor unit 3 (once more, it should be remembered that, if the articles P are not already sufficiently spaced out on the conveyor A, a separator/metering conveyor may be interposed) resting horizontally on the upstream ends of the active passes 6a and 7a of the conveyors 6 and 7, these ends being situated at the same height.

As a result of its gradual advance on the conveyors 6 and 7, brought about by the movement of the conveyors, the end of the article P which is resting on the conveyor 7 is raised gradually relative to its opposite end which rests on the conveyor 6 so that the article P arrives at the output end of the conveyor 6 in an inclined position, that is, with one end (the rear end as seen in FIGS. 1 and 3) raised relative to the opposite end (the front end in FIGS. 1 and 3).

FIG. 2 shows, in deliberately exaggerated manner, the inclined condition reached by the product P.

It can easily be seen from an observation of FIG. 2 that, particularly when the articles P are supplied to the conveyors 6 and 7 so that only a small end portion bears on the conveyor 7, at the output end of the conveyor 6, each article P is in fact supported at its ends. This takes place wholly irrespective of any surface irregularities (for example projecting hazelnuts N) on the lower surface of the article P, even with marked irregularities. Naturally, the article P has meanwhile retained its general orientation with its major axis perpendicular to the direction of advance defined by the conveyors 6 and 7; as stated, the two conveyors in question are usually advanced at the same speed.

At this point, the article P is partially transferred, by its lower end, on to the conveyor 4.

In fact, the conveyor 6 has its output end precisely in the region in which the inclined arrangement of the articles P shown in FIG. 2 is brought about. In other words, in this position of advance, the lower end of the article P is transferred from the conveyor 6 to the conveyor pass 4a of the conveyor 4 situated downstream.

Since the downstream end 8 of the conveyor 7 extends beyond the region described above, projecting over the active pass 4a of the conveyor 4, the article P is still supported at its upper end by the active pass of the conveyor 7.

The drive of the conveyor 4 is regulated in a manner such that the conveyor pass 4a moves at a different speed of advance, particularly faster than the conveyor 7. As a result, the lower end of the article P bearing on the conveyor 4 starts to move forwards (with a relative movement, since the general transportation movement of the articles P nevertheless continues) relative to the upper end which still rests on the conveyor 7. This situation brings about a gradual turning movement of the articles P in a sense such as to turn them gradually from the position in which they advance "crosswise" (input conveyor A) towards the position in which they advance lengthwise (output conveyor B).

When the upper end of each article P also falls from the output end 8 of the conveyor 7 onto the conveyor pass 4a of the conveyor 4, the at least partially rotated articles P advance and are brought into abutment with the active pass 5a of the belt device 5 which completes the 90° turn (see FIG. 3).

The extent of the turning movement achieved (that is, the amplitude of the angle of the rotation undergone by the articles P) at the downstream end of the conveyor unit 3 depends essentially on two factors, that is:

the difference between the speed of advance of the conveyor 7 and the speed of advance of the conveyor 4, and the length of the downstream portion of the conveyor 7 which extends over the conveyor 4.

Clearly, for a given speed difference, the turning effect is more marked the longer is the section in which each article P bears on the conveyor 4 at one (lower) end and on the conveyor 7 at the other (upper) end.

Conversely, for a given length of the aforesaid section, the turning effect is more marked the greater is the difference between the speeds.

The turning movement can thus be regulated precisely within the desired limits by means of the two parameters during the adjustment of the device 1. In particular, the length of the downstream portion 8 of the conveyor 7 which projects over the conveyor 4 is adjusted, in accordance with known criteria, by means of the adjustment mechanism indicated 10. The two speeds are adjusted (in accordance with known criteria) by means of the drives of the conveyors 4 and 7 (and 6 in dependent manner).

It will be appreciated that the solution described with reference to the drawings presupposes that the conveyor 4 is advanced at a faster speed than the conveyor 7. The solution illustrated in the drawings in fact provides for the turning movement of the articles P to be brought about as a result of a right-handed or clockwise rotation as seen in FIGS. 1 and 3.

Although this solution is preferable for various reasons, it is not essential. In fact, a complementary solution in which the conveyor 4 moves at a slower speed than the conveyor 7 could also be considered; in this case, the turning movement of the articles P would take place, as seen in FIGS. 1 and 3, as a result of a left-handed or anticlockwise rotation.

The height adjustment of the idler element 11 enables the amount of height difference between the output end 8 of the conveyor 7 and the common plane of the active passes 4a and 6a of the conveyor 4 and 6 to be adapted precisely to the morphological characteristics of the articles P.

In fact, a "long" article usually requires a greater height difference than a "short" article (naturally, the indications of length relate to the major axes of the articles P). Conversely, an article with a very irregular lower surface usually requires a greater height difference than an article P with a lower surface having fewer irregularities.

The user of the device can thus adjust the operating conditions in an optimal manner, taking account of the dimensions and aspect of the articles P processed, avoiding the use of greater height differences than necessary.

It can easily be understood from an observation of FIG. 2 that, in the device according to the invention, the turning movement is rendered certain and controllable precisely because it is brought about, in principle, when each article P is supported precisely at its ends, irrespective of the presence of more or less marked irregularities on its lower surface.

Naturally, the principle of the invention remaining the same, the details of construction and forms of embodiment may be varied widely with respect to those described and illustrated, without thereby departing from the scope of the present invention.

What is claimed is:

1. A device for turning round articles each having two opposed ends aligned on a given axis, comprising:

first conveyor means operating with least at one first transportation speed in a respective direction of advance and having an input end which, in use, receive the articles with the given axis arranged transverse the direction of advance, the first conveyor means having a downstream portion to support the articles at one of the said ends in a generally raised position relative to the opposite end, the downstream portion projecting from the first conveyor means in the direction of transportation of the first means, and second conveyor means to receive the articles in a supported position from the first conveyor means, the second conveyor means having an upstream end situated at least partially beneath the downstream portion of the first conveyor means and moving, in use, at a second transportation speed different from the at least one transportation speed of the first conveyor means so that, in the region of the downstream portion, the articles supported at the two opposed ends on the downstream portion and on the second conveyor means, respectively, are turned as a result of the difference between the first and second transportation speeds.

2. The device of claim 1, wherein the first conveyor means comprise two separate conveyor elements arranged side by side for supporting the respective opposite ends of the articles, and wherein the downstream portion is defined by one of the two conveyor elements which has a respective downstream portion extending in a raised position and projecting generally relative to the respective downstream portion of the other of the two conveyor elements.

3. The device of claim 2, wherein the respective downstream portion of the other of the two conveyor elements is substantially coplanar with the upstream end of the second conveyor means.

4. The device of claim 1, wherein the downstream portion has associated height-adjustment means for the selective variation of the height of the downstream portion relative to the second conveyor means.

5. The device of claim 1, wherein the downstream portion has associated projection—adjustment means for the selective adjustment of the amount by which the downstream portion projects over the second conveyor means.

6. The device of claim 1, wherein the first and second conveyor means comprise motor-driven belt conveyors.

7. The device of claim 1, wherein the second conveyor means have associated alignment means to receive the articles subjected to a partial turning movement at the upstream end of the second conveyor means in order to complete the turning movement of the articles.

8. The device of claim 7, wherein the alignment means comprise a motor-driven belt comprising an active pass extending in a generally perpendicular direction in a position above the second conveyor means.

* * * * *